Sept. 26, 1933.    P. MITCHELL    1,928,458
RING FRACTURING MACHINE
Filed Jan. 2, 1930
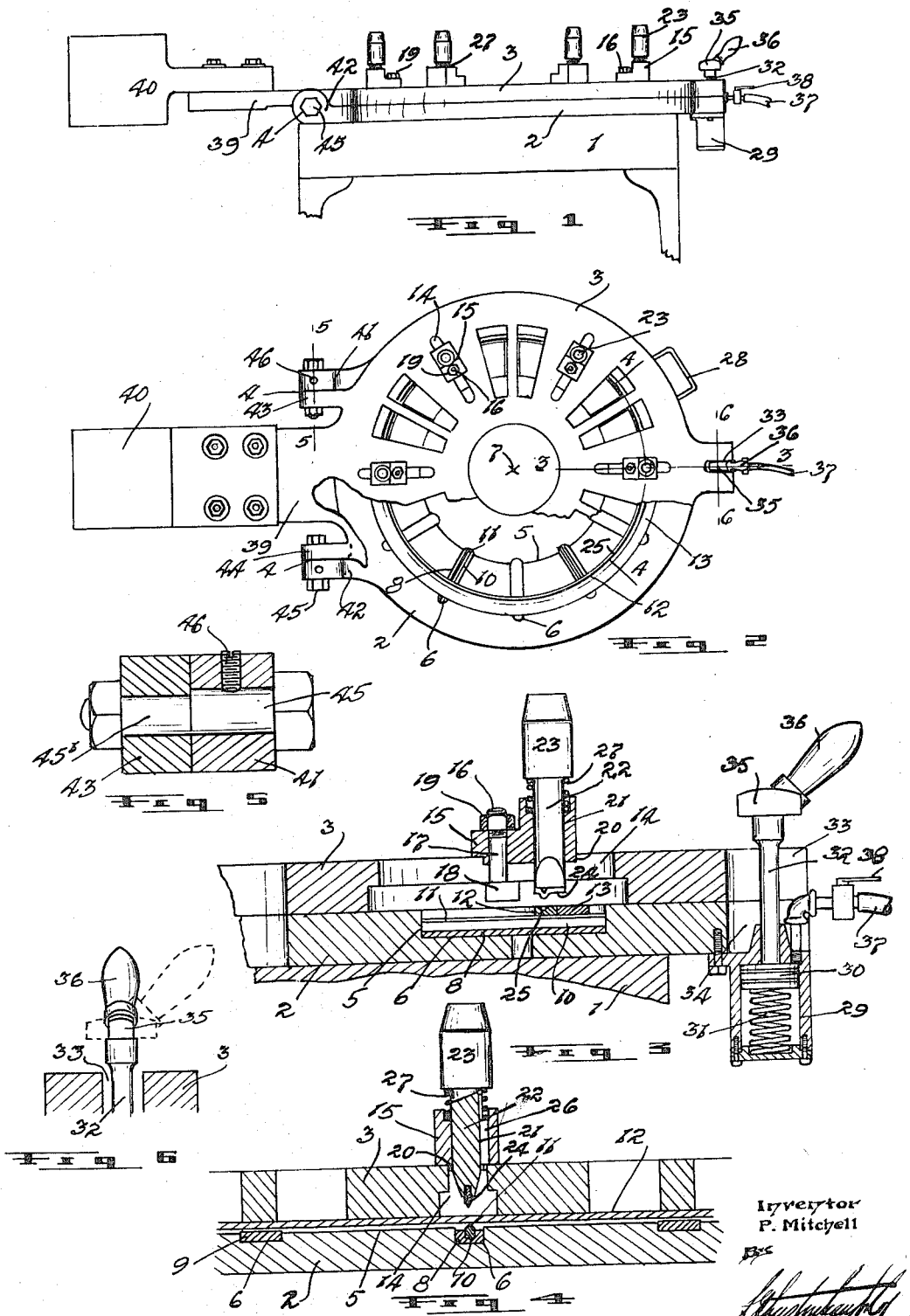
Inventor
P. Mitchell Patented Sept. 26, 1933

1,928,458

UNITED STATES PATENT OFFICE 1,928,458

RING FRACTURING MACHINE

Peter Mitchell, Winnipeg, Manitoba, Canada

Application January 2, 1930. Serial No. 418,076

10 Claims. (Cl. 29—66)

The invention relates to improvements in ring fracturing machines and particularly to a machine for fracturing piston rings such as used on locomotive and such like type engines and an object of the invention is to provide a machine whereby a precast metal ring such as of cast iron can be accurately, easily and quickly, transversely fractured to divide the ring into a number of segments and which after fracturing and upon slight grinding can be re-assembled and used on the piston in the usual manner.

A further object is to construct the machine in a simple, durable and inexpensive manner and so that rings of various size can be easily and accurately set in place for fracturing and after having been set can be clamped so that they are held during the interval that they are being fractured and further to provide tools associated with the machine which can be easily set in regard to the ring to be fractured, the positioning of the tools being such that all segments will be of the same length and interchangeable and that the segments of a plurality of similar fractured rings will be the same.

A further object is to embody as part of the device, an air cylinder for effectively clamping the rings in place, the air cylinder being directly under the control of the operator.

A further object is to construct the machine so that rings of varying thickness may be clamped therein for fracturing purposes.

With the above more important and other minor objects in view which will become more apparent as the description proceeds, the invention consists essentially in the arrangement and construction of parts hereinafter more particularly described, reference being had to the accompanying drawing, in which:—

Fig. 1 is a side view of the complete machine.

Fig. 2 is a plan view, part of the upper clamping plate being broken away to expose construction.

Fig. 3 is an enlarged detail vertical sectional view at 3—3 Figure 2, certain parts being shown in side elevation.

Fig. 4 is a vertical sectional view at 4—4 Figure 2.

Fig. 5 is an enlarged detail vertical sectional view at 5—5 Figure 2.

Fig. 6 is an enlarged detailed vertical sectional view at 6—6 Figure 2.

In the drawing like characters of reference indicate corresponding parts in the several figures.

I might initially explain that at the present time, piston rings are being used in locomotive engines, the rings being circular and formed from a plurality of segments. These rings are made from cast iron and according to the present practice the ring is cast and has on such account a fixed internal and external radius. After the ring is cast, it is cut by a saw blade at intervals to provide the required number of ring segments which segments at the present time are all numbered as it is found that they are not interchangeable.

By so cutting the ring into segments by a saw blade, there is an inaccuracy occurring in the fit of the assembled ring segments due to the removal of the metal cut by the saw. Obviously if the saw cut segments be re-assembled with their ends butted, they will not have a common centre point and on the other hand, if they be re-assembled with a common centre point, there will be escape passages between the ends of the ring segments.

According to my invention, I have devised a machine by the use of which the ring can be transversely fractured at desired points, thereby avoiding the loss of metal as occurs in saw cutting and accordingly, there is virtually no loss of material so that the ring segments obtained fit accurately.

A suitable base or bed 1 is provided and on this I mount in any suitable manner a bottom plate 2 herein shown as circular, above which I locate a circular top plate 3, the top and bottom plates being hingedly connected together as indicated generally by the reference numeral 4.

The arrangement is such that the top plate can be readily swung upwardly away from the bottom plate in order to permit of the ready insertion of the cast ring. The machine herein shown is particularly devised for fracturing the cast iron piston rings of locomotive engines which are circular.

The bottom plate is provided in its top face with an annular channel 5 of predetermined width and depth and the base of the channel is transversely slotted in a number of places as indicated at 6, the slots being positioned accurately so that they are all radial to the central axis of the annular channel, that is, radial to the centre point 7, Figure 2. The piston rings as at present used are cut at the present time into six segments and I accordingly provide the base plate with twelve radial slots 6, all spaced accurately an equal distance apart and one set of six slots being utilized to receive tool holders 8 and the other set of six slots receiving jam plates 9, the tool holders being alternated with the jam plates. It will be observed that the jam plates have their upper faces extending slightly above the horizontal plane containing the base of the channel (see Figure 4).

The tool holders are all similar and they have each a hardened steel cutter 10 inserted therein, the cutter presenting a V-shaped blade 11. It is very important that the sharpened edges of the blades be all set radial to the centre point 7 and that they be accurately spaced an equal distance apart. It will be also observed that the sharpened edges of the blades of the cutters extend into a slightly higher horizontal plane than the horizontal plane containing the upper faces of the plates 9.

The width of the channel 5 is such that it will receive piston rings of varying diameter.

The piston ring 12 to be fractured is placed in a horizontal lying position resting on the blades of the cutters and is centered accurately in regard to the centre point 7. The ring herein shown is of such a diameter than an outer centering ring 13 has been inserted, the ring 13 having its outer edge engaging with the outer wall of the channel and its inner edge engaging with the outer edge of the ring 12. If a larger ring than that 12 were placed in the machine, a smaller ring 13 would be used and if a smaller ring than that 12 were to be fractured in the machine, a larger ring than that 13 would be used or several rings such as that 13.

The upper plate is provided with six similar slots 14 T-shaped in vertical cross section, the slots being radial to the centre point of the plate and being equi-spaced apart and being located such that when the top plate is closed against the bottom plate, the latter slots overlie the cutters of the bottom plate. Each slot 14 receives slidably the base of a chisel guide 15, the chisel guide being adjustably held in place by a bolt 16, the shank 17 of which passes through the contracted or narrow portion of the slot 14 and the head 18 of which is received in the lower or larger part of the slot. By releasing the nut 19 of the bolt, one can shift the chisel guide in a direction radial to the centre point of the plate and when properly adjusted, can fasten it firmly by tightening up the nut and it is here pointed out that the under side of the guide is provided with a guiding extension or rib 20 slidably received in the upper part of the slot 14.

The guide in each instance is vertically bored as indicated at 21 to receive slidably a shank 22, the shank having the upper end thereof terminating in an enlarged head 23 and the lower end thereof substantially V-shaped in vertical cross section and carrying a hardened steel chisel or cutter 24 formed to the shape of the upper face of the piston ring. I might here explain that the piston ring herein shown is provided with a groove 25 in its upper face and accordingly the chisel or cutter is shaped to correspond. The shank 22 in each instance is vertically slotted to receive a guiding key 26 carried by the chisel guide, such arrangement preventing a rotation of the shank in the guide but permitting of the ready endwise shifting movement of the shank. A coiled spring 27 interposed between the head 23 and the guide, operates to hold the head and consequently the cutter 24 in its upper position as best shown in Figures 3 and 4.

I wish it to be here distinctly understood that when the top plate is closed down tightly against the bottom plate, the cutting edges of the cutters 24 are vertically above the cutting edges of the cutters 10 and that all cutters are radial to a vertical axis passing through the centre point 7. Obviously the cutters 24 will be set so that when the heads 23 are struck down as by a mallet or hammer, they will strike the upper face of the inserted piston ring.

The upper plate is provided with a handle 28 for manipulating purposes and suitable means is provided for clamping the top and bottom plates together. In the present instance, I have fastened an air cylinder 29 to the underside of the bottom plate remote from the hinges and this cylinder contains a piston 30 and a spring 31 normally forcing the piston upwardly.

The piston rod 32 extends upwardly through suitable open ended slots 33 and 34 provided in the plates and has the upper end thereof terminating above the slot 33 in a substantially rectangular head 35 which when set in the position shown in the drawing, is free to escape through the slot 33 upon the top plate being raised. A handle 36 extends angularly outwardly from the head 35 and obviously after one has closed the plate 3 down against the plate 2, one can turn the handle 90° in either direction so that the head 35 will sit transversely of the slot 33. An air or other such pressure pipe 37 leads to the upper end of the cylinder and the passage of air is controlled by a suitable two-way cock or valve 38.

Assuming the parts positioned as shown best in Figures 2 and 3 and that it is desired to clamp the plates together, it will be only necessary for the attendant to swing the handle 90° in either direction from that shown and then turn the valve 38 to "on" position at which time the air or other fluid entering the cylinder, will force the piston down and cause the head 35 to close against the upper plate and effect the clamping of the plates together. The air cylinder so provided is very effective and allows the work to be done very quickly and easily.

I have also considered it desirable to counter balance the upper plate 3 so that after it has been released by the clamping device, it will have a natural tendency to rise in order to permit of the ready insertion of another ring. To this end, the top plate at the side adjacent the hinges is provided with an extension or tail piece 39 to which I fasten a weight or counter balance 40.

In Figure 6, I have shown in dotted outline, the position occupied by the head 35 and handle 36 when they have been turned 90°.

I have hereinbefore remarked that this machine can be used to fracture piston rings of different thickness and the machine herein shown will take piston rings of two different thicknesses. This latter is accomplished in the following manner.

The bottom plate is provided with a pair of extending bearing lugs 41 and 42 and the top plate with a pair of extending bearing lugs 43 and 44 and the lugs receive similar bolts 45 which hingedly connect the plates together. The bolt in each instance is fastened by a jam screw 46 to the lug 41 or 42 and has that part 45' thereof which is received within the lug 43 or 44 eccentric as best shown in Figure 5. According to this arrangement, if the eccentric parts 45' of the bolts be "set down", the top plate will be set as it should be when the machine is to receive the piston ring of least thickness, whereas, if the eccentric portion 45' be "set up", the machine will be set as it should be to receive the piston ring of the greatest thickness. The setting of the bolts 45 is accomplished by releasing the jam screws 46 and turning the bolts 180° and then tightening down the jam screws.

When it is desired to sever the ring, it is only necessary to place and centre it in the channel 5 with the under side thereof resting on the cutters 10, all cutters having been previously properly set, then clamp the plates together in the manner described and then finally strike each of the heads 23 a sharp blow with a hammer or mallet to cause the transverse fracturing of the rings at the desired points and into the desired number of segments. Subsequently the top plate is released and swung up and the segments are removed.

I have found that after the ring has been fractured to form the segments that it is only necessary to "touch up" the ends of the segments on an emery stone and it will be found that they are then all interchangeable, any six of which can be used to form the re-assembled piston ring. The re-assembled ring will fit the cylinder very accurately.

It is to be particularly noted that when the non-severed ring is clamped in the machine that the ring is tensioned by the clamping over six transversely extending fulcrums, such fulcrums being the sharp edges of the cutters 10. Consequently when the top face of the ring is struck successively six sharp blows by the chisels in locations directly above the fulcrums which are the positions where the ring is in greatest tension, the said ring will fracture in definite directions which in the machine herein shown are radial to the centre point 7.

What I claim as my invention is:—

1. The method of severing a cast metal ring at several selected points which consists in tensioning the ring at those selected points over fulcrums passing transversely across the ring at such points and subsequently striking the face of the ring remote from the fulcrums a succession of sharp blows above the fulcrums.

2. The method of severing a cast metal ring into a number of sections which consists in clamping the ring between two members and effecting by such clamping a tensioning of the ring at a number of selected points over a number of fulcrum points and subsequently striking the ring a sharp blow at the tensioned points.

3. The method of transversely severing a cast metal ring at a number of desired points which consists in clamping the ring between two members and effecting by such clamping a tensioning of the ring at such desired points over fulcrums extending transversely of the ring at such points and then striking the ring a sharp blow successively at the tensioned points.

4. A machine for fracturing a cast metal ring into a number of segments comprising two members between which the ring is clamped, said clamping members being arranged to effect a tensioning of the ring at desired points and ring striking members adapted when actuated to hit the ring at the tensioned points, said ring striking members each having the part striking the ring disposed radial to the centre of the ring.

5. A machine for fracturing a cast metal ring into a number of segments comprising a bottom plate provided with a number of spaced cutters supporting the ring and disposed radial to the centre point of the ring, a top plate clamped to the bottom plate and engaging the ring, said clamped plates being designed to tension the ring over the several fulcrum points provided by the cutters and upper cutters carried by the top plate and positioned over the former cutters and radial to the centre point of the ring and mounted to permit of them being struck towards and into contact with the ring to engage the same at the tensioned points.

6. A machine for fracturing a cast metal ring into a number of segments comprising a lower base plate, a plurality of cutters carried by the plate and supporting the ring, said cutters being disposed radial to the ring, a top plate, means for clamping the ring between the plates, means for effecting a tensioning of the clamped ring over the fulcrum points provided by the cutters, tool holders carried by the upper plate and mounted for adjustment in a direction radial to the centre point of the clamped ring and a cutter carried by each tool holder, said cutters overlying the former cutters and being positioned radial to the centre point of the clamped ring, said top cutters being also mounted to permit of them being struck towards and into contact with the adjacent face of the ring.

7. In a ring fracturing machine, upper and lower clamping plates between which the ring is clamped, said plates carrying ring fracturing means and being provided with pairs of extending bearing lugs, pivot bolts passing through the pairs of lugs and hingedly connecting the plates together, each of the bolts being provided with an eccentric portion received in one of the lugs of the pair and jam screws carried by one of the lugs of the pairs and engaging the bolts.

8. A machine for fracturing a cast metal member along predetermined lines comprising a plurality of spaced fulcrum edges adapted for supporting engagement with one face of said member, means for applying pressure to the member to tension the same across said edges and a plurality of cutters adapted to be driven into fracturing engagement with the opposite face of said member at points directly opposite the fulcrum edges.

9. A machine for fracturing a cast metal member along predetermined lines comprising a support presenting a plurality of spaced fulcrum edges adapted for supporting engagement with one face of said member, means for applying pressure to the opposite face of the member at points between the fulcrum edges so that the member is tensioned across said edges and a plurality of cutters adapted to be driven into fracturing engagement with the last mentioned face of the member at points in line with said edges.

10. The method of severing a cast metal member which consists in placing the member over and across a sharp straight stationary fulcrum edge, applying a downward pressure on the extending portions of the member, placing a sharp straight cutter over and in contact with the member and in alignment with the fulcrum edge and striking the cutter a sharp blow.

PETER MITCHELL.